US008266457B2

(12) United States Patent
Huang et al.

(10) Patent No.: US 8,266,457 B2
(45) Date of Patent: Sep. 11, 2012

(54) DATA PROCESSING DEVICE AND METHOD FOR SWITCHING STATES THEREOF

(75) Inventors: Maolin Huang, Beijing (CN); Xiaojian Ding, Beijing (CN); Xingwen Chen, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 618 days.

(21) Appl. No.: 12/393,072

(22) Filed: Feb. 26, 2009

(65) Prior Publication Data
US 2009/0217071 A1 Aug. 27, 2009

(30) Foreign Application Priority Data

Feb. 27, 2008 (CN) .......................... 2008 1 0101035

(51) Int. Cl.
*G06F 1/00* (2006.01)
(52) U.S. Cl. .......................... 713/300; 713/310; 713/323
(58) Field of Classification Search .................. 713/300, 713/310, 323
See application file for complete search history.

(56) References Cited

U.S. PATENT DOCUMENTS

| | | | | |
|---|---|---|---|---|
| 5,729,675 A * | 3/1998 | Miller et al. | | 714/36 |
| 5,745,105 A * | 4/1998 | Kim | | 345/212 |
| 5,953,536 A * | 9/1999 | Nowlin, Jr. | | 713/323 |
| 6,393,584 B1 * | 5/2002 | McLaren et al. | | 714/14 |
| 7,100,062 B2 * | 8/2006 | Nicholas | | 713/323 |
| 7,243,249 B1 * | 7/2007 | Dunstan et al. | | 713/310 |
| 7,434,072 B2 * | 10/2008 | Peirson et al. | | 713/300 |
| 7,500,127 B2 * | 3/2009 | Fleck et al. | | 713/324 |
| 7,594,073 B2 * | 9/2009 | Hanebutte et al. | | 711/113 |
| 7,925,900 B2 * | 4/2011 | Parks et al. | | 713/300 |
| 7,949,889 B2 * | 5/2011 | Sotomayor et al. | | 713/323 |
| 2005/0239518 A1 * | 10/2005 | D'Agostino et al. | | 455/574 |
| 2008/0028243 A1 * | 1/2008 | Morisawa | | 713/323 |
| 2008/0126815 A1 * | 5/2008 | Cantwell et al. | | 713/323 |
| 2008/0256374 A1 * | 10/2008 | Harris et al. | | 713/323 |
| 2009/0177422 A1 * | 7/2009 | Cox et al. | | 702/64 |
| 2009/0178141 A1 * | 7/2009 | Panasyuk | | 726/24 |

* cited by examiner

*Primary Examiner* — Paul R Myers
*Assistant Examiner* — Christopher A Daley
(74) *Attorney, Agent, or Firm* — Dickstein Shapiro LLP (57) ABSTRACT

The present invention provides a data processing device and a method for switching states thereof. The data processing device comprises an operating system and a communication interface for communicating with another data processing device, wherein the communication interface is enabled when the operating system stays in the operating state of the operating system, and the communication interface is disabled when the operating system stays in a low-power-consumption state. The method for switching states comprises the following steps of: detecting whether the communication interface stays in the operating state of the communication interface and generating detection information; determining whether the operating system stays in the operating state of the operating system when the detection information indicates that the communication interface stays in the operating state of the communication interface, and generating determination information; generating a system state holding command when the determination information indicates that the operating system stays in the operating state of the operating system; and controlling the operating system to stay in the operating state of the operating system based on the system state holding command. The present invention can not only secure communication via the data communication interface, but also allow the operating system to handle normally and stably an interrupt, so as to reduce the system power consumption.

8 Claims, 5 Drawing Sheets

DATA PROCESSING DEVICE AND METHOD FOR SWITCHING STATES THEREOF

BACKGROUND OF THE INVENTION

1. Field of Invention

The present invention relates to the computer field, in particular to a data processing device and a method for switching states thereof.

2. Description of Prior Art

As an embedded operating system, WinCE has been widely used in the embedded field due to its well-known advantages, such as its fruitful contents, general functions, convenient development experiences and powerful transplantation. On the other hand, the current intelligent devices mostly adopt USB (Universal Serial Bus) interfaces to communicate with other devices. In order to allow these devices with USB interfaces to operate in the Ethernet, both of Remote Network Driver Interface Specification (RNDIS) and CDC Ethernet may be applied. Specifically, RNDIS is an application interface, provided by Microsoft, which may be used by USB devices to access a Local Area Network.

An embedded subsystem adopts WinCE as a basic platform, while adopting RNDIS as a high-speed communication channel between itself and a notebook computer. However, since RNDIS is a network device driver achieved based on a USB Device Controller (UDC), RNDIS connection will break and can not reconnect, even resulting in a crash of the WinCE operating system and malfunction of the system, when WinCE switches between its operating state and an IDLE state. The main reason lies in that, during a state switching, it is necessary for WinCE to change the operating frequency of the system in order to reduce the system power consumption, however, such switching leads to a case in which the system can not normally handle a task such as a system interrupt during a certain period.

SUMMARY OF THE INVENTION

The present invention provides a data processing device and a method for switching states thereof, so that an operating system may handle normally and stably an interrupt while securing communication via a communication interface.

A data processing device according to an embodiment of the present invention comprises an operating system and a communication interface for communicating with another data processing device, wherein the communication interface is enabled when the operating system stays in an operating state of the operating system, and the communication interface is disabled when the operating system stays in a low-power-consumption state.

The method for switching states of the data processing device comprises the following steps of: detecting whether the communication interface stays in an operating state of the communication interface and generating detection information; determining whether the operating system stays in the operating state of the operating system when the detection information indicates that the communication interface stays in the operating state of the communication interface, and generating determination information; generating a system state holding command when the determination information indicates that the operating system stays in the operating state of the operating system; and controlling the operating system to stay in the operating state of the operating system based on the system state holding command.

Alternatively, the method for switching states of the data processing device comprises the following steps of: detecting whether the communication interface stays in the operating state of the communication interface and generating detection information; determining whether the operating system stays in the operating state of the operating system when the detection information indicates that the communication interface stays in the non-operating state of the communication interface and generating determination information; generating a system state frequency-reduction command when the determination information indicates that the operating system stays in the operating state of the operating system; and controlling the operating system to enter into the low-power-consumption state from the operating state of the operating system based on the system state frequency-reduction command.

Alternatively, the method for switching states of the data processing device comprises the following steps of: detecting whether the communication interface stays in the operating state of the communication interface and generating detection information; determining whether the operating system stays in the operating state of the operating system when the detection information indicates that the communication interface stays in the operating state of the communication interface and generating determination information; generating a system state frequency-ascending command when the determination information indicates that the operating system stays in the low-power-consumption state; and controlling the operating system to enter into the operating state of the operating system from the low-power-consumption state based on the system state frequency-ascending command, and then controlling the communication interface to be enabled when the operating system enters into the operating state of the operating system from the low-power-consumption state.

The data processing device further comprises: a detection unit for detecting whether the communication interface stays in the operating state of the communication interface and generating detection information; a system state management unit, connected to the detection unit, for determining whether the operating system stays in the operating state of the operating system when the detection information indicates that the communication interface stays in the operating state of the communication interface and generating determination information, for generating a system state holding command when the determination information indicates that the operating system stays in the operating state of the operating system, and for controlling the operating system to stay in the operating state of the operating system based on the system state holding command.

The system state management unit comprises: a first determination unit, connected to the detection unit, for determining whether the operating system stays in the operating state of the operating system when the detection information indicates that the communication interface stays in the operating state of the communication interface and generating determination information; a first management unit, connected to the first determination unit, for generating the system state holding command when the determination information indicates that the operating system stays in the operating state of the operating system; and a first execution unit, connected to a first command unit, for controlling the operating system to stay in the operating state of the operating system based on the system state holding command.

The system state management unit further comprises: a second determination unit, connected to the detection unit, for determining whether the operating system stays in the operating state of the operating system when the detection information indicates that the communication interface stays in the non-operating state of the communication interface and generating determination information; a second management unit, connected to the second determination unit, for generating a system state frequency-reduction command when the determination information indicates that the operating system stays in the operating state of the operating system; and a second execution unit, connected to a second command unit, for controlling the operating system to enter into the low-power-consumption state from the operating state of the operating system based on the system state frequency-reduction command.

Alternatively, the data processing device further comprises: a detection unit for detecting whether the communication interface stays in the operating state of the communication interface and generating detection information; and a system state management unit, connected to the detection unit, for determining whether the operating system stays in the operating state of the operating system when the detection information indicates that the communication interface stays in the operating state of the communication interface and generating determination information, for generating a system state frequency-ascending command when the determination information indicates that the operating system stays in the low-power-consumption state, and for controlling the operating system to enter into the operating state of the operating system from the low-power-consumption state based on the system state frequency-ascending command, and then controlling the communication interface to be enabled when the operating system enters into the operating state of the operating system from the low-power-consumption state.

The system state management unit comprises: a determination unit, connected to the detection unit, for determining whether the operating system stays in the operating state of the operating system when the detection information indicates that the communication interface stays in the operating state of the communication interface and generating determination information; a management unit, connected to the determination unit, for generating a system state frequency-ascending command when the determination information indicates that the operating system stays in the low-power-consumption state; and an execution unit, connected to a command unit, for controlling the operating system to enter into the operating state of the operating system from the low-power-consumption state based on the system state frequency-ascending command, and then controlling the communication interface to be enabled when the operating system enters into the operating state of the operating system from the low-power-consumption state.

The present invention can not only secure communication via the communication interface, but also allow the operating system to handle normally and stably an interrupt, so as to reduce the system power consumption.

BRIEF DESCRIPTION OF THE DRAWINGS

The invention will be further understood by means of the drawings, which constitute a part of the present invention. Exemplary embodiments of the present invention and illustrations thereof are used to explain the present invention, by no way of limiting the present invention. In the drawings.

DETAILED DESCRIPTION OF PREFERRED EMBODIMENTS

Hereinafter, specific embodiments of the present invention will be described in detail by referring to the drawings.

A data processing device according to an embodiment of the present invention comprises an operating system and a communication interface for communicating with another data processing device, wherein the communication interface is enabled when the operating system stays in the operating state of the operating system, and the communication interface is disabled when the operating system stays in a low-power-consumption state, and wherein the communication interface staying in the operating state of the communication interface means that the communication interface is in a data communication with another data processing device.

Figure 1:
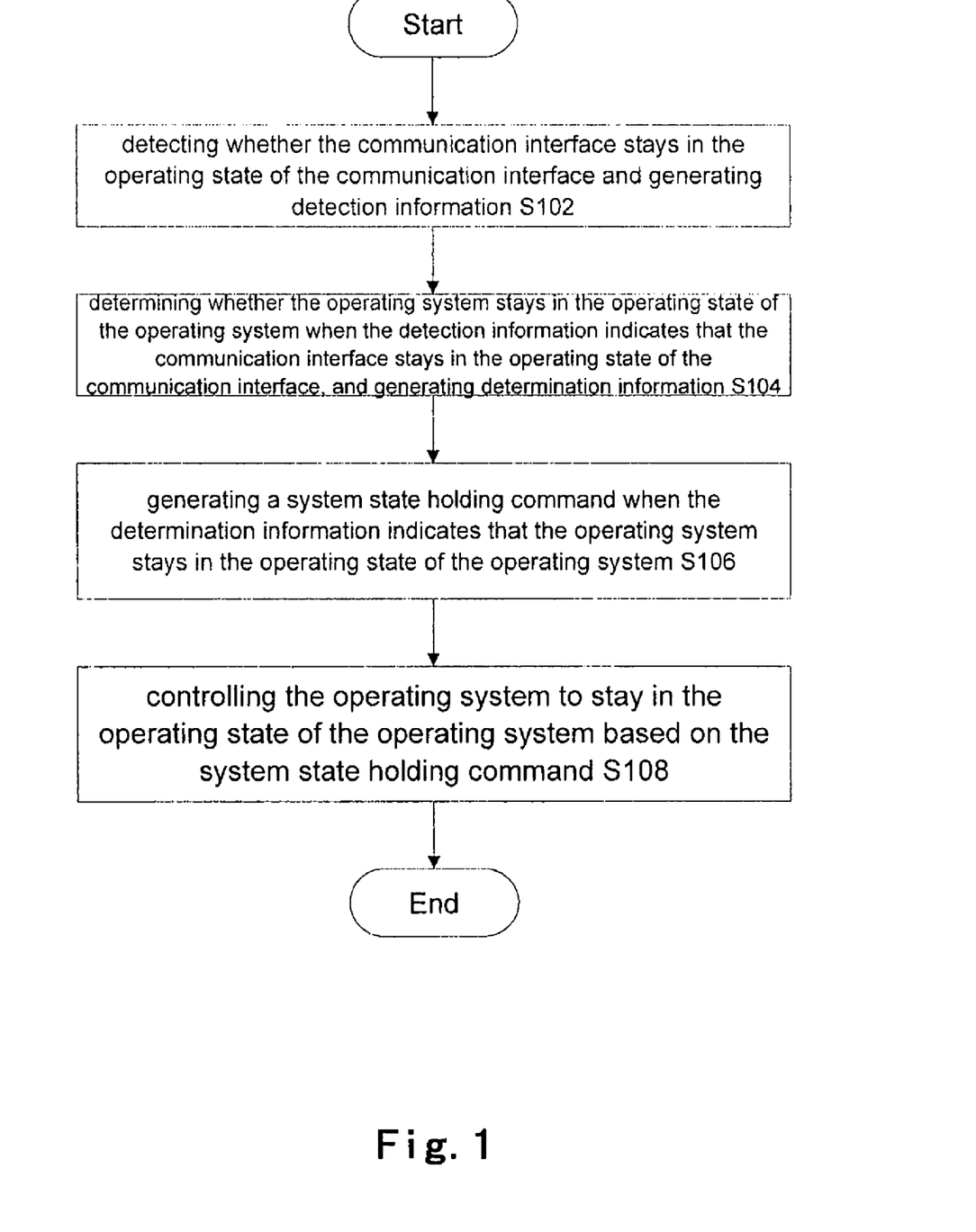
FIG. 1 is a flowchart for a method for switching states of a data processing device according to one embodiment of the present invention.

FIG. 1 is a flowchart for a method for switching states of a data processing device according to one embodiment of the present invention. As shown in FIG. 1, the method for switching states of the data processing device comprises the following steps: step S102 of detecting whether the communication interface stays in the operating state of the communication interface and generating detection information; step S104 of determining whether the operating system stays in the operating state of the operating system when the detection information indicates that the communication interface stays in the operating state of the communication interface, and generating determination information, wherein the communication interface staying in the operating state of the communication interface means that a USB communication interface is in a data communication with another data processing device, i.e. there is a data exchange between the USB communication interface and another data processing device; step S106 of generating a system state holding command when the determination information indicates that the operating system stays in the operating state of the operating system; and step S108 of controlling the operating system to stay in the operating state of the operating system based on the system state holding command.

Figure 2:
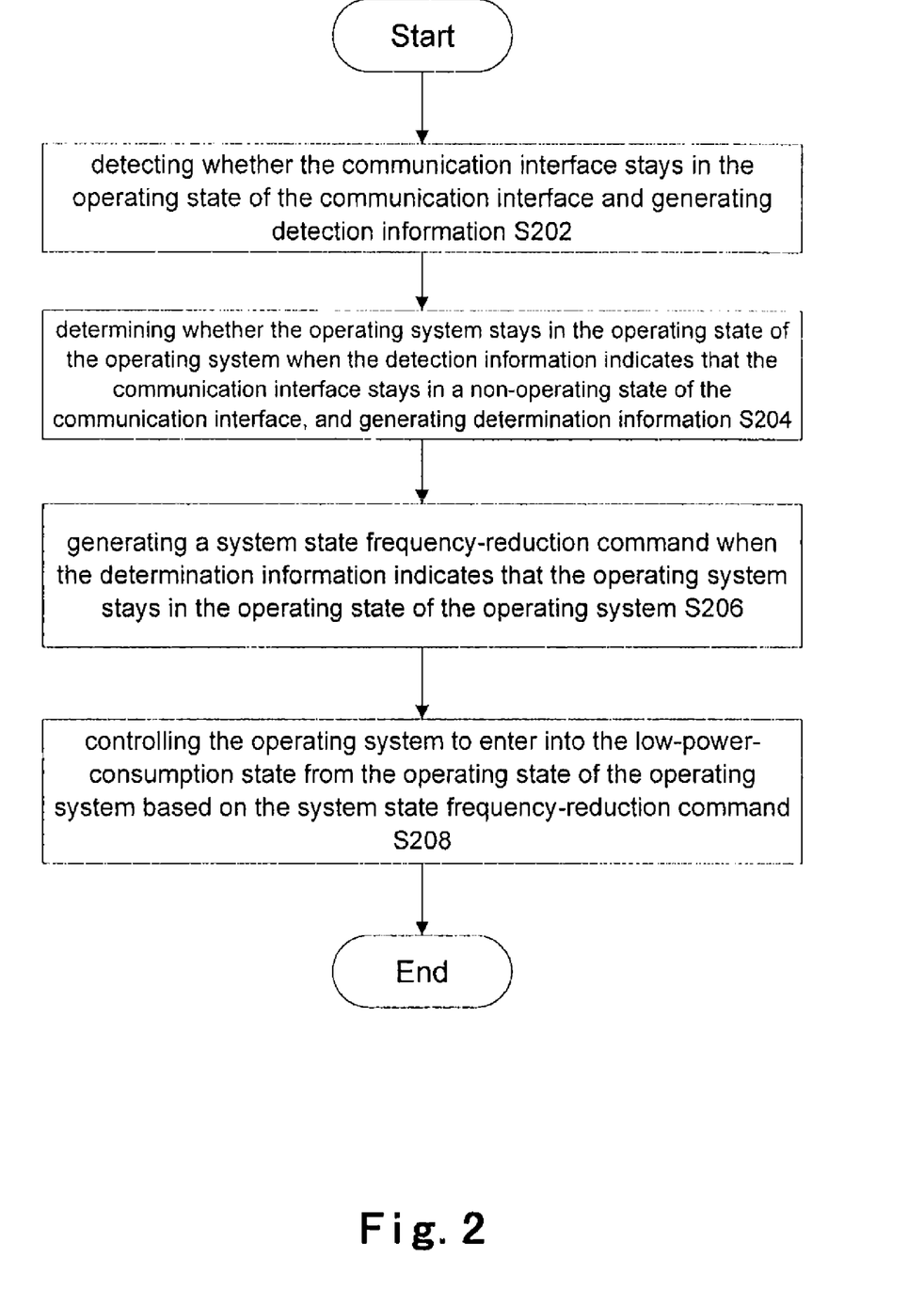
FIG. 2 is a flowchart for a method for switching states of a data processing device according to another embodiment of the present invention.

FIG. 2 is a flowchart for a method for switching states of a data processing device according to one embodiment of the present invention. As shown in FIG. 2, the method for switching states of the data processing device comprises the following steps: step S202 of detecting whether the communication interface stays in the operating state of the communication interface and generating detection information; step S204 of determining whether the operating system stays in the operating state of the operating system when the detection information indicates that the communication interface stays in the non-operating state of the communication interface, and generating determination information, wherein the communication interface staying in the non-operating state of the communication interface means that there is no data communication between a USB communication interface and another data processing device; step S206 of generating a system state frequency-reduction command when the determination information indicates that the operating system stays in the operating state of the operating system; and step S208 of controlling the operating system to enter into the low-power-consumption state from the operating state of the operating system based on the system state frequency-reduction command.

Figure 3:
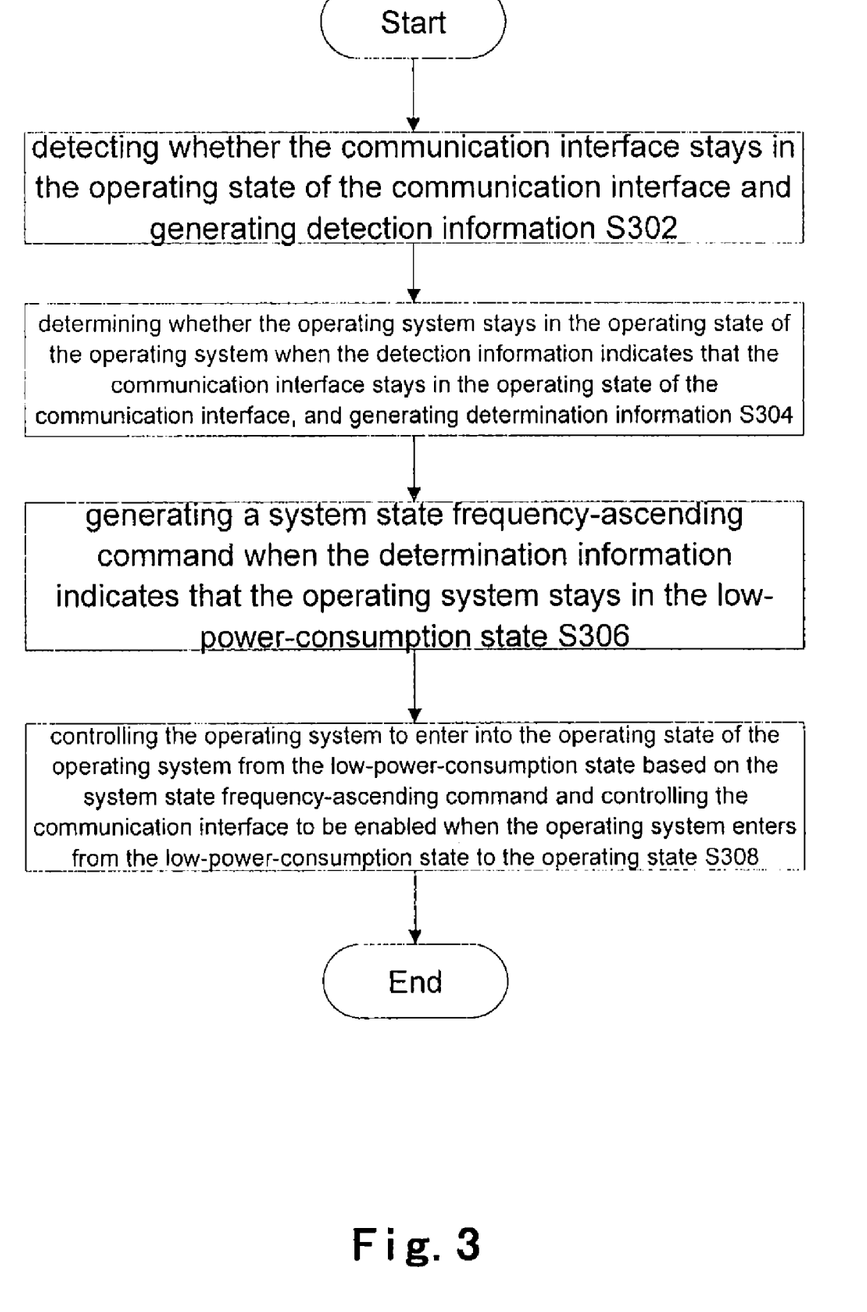
FIG. 3 is a flowchart for a method for switching states of a data processing device according to another embodiment of the present invention.

FIG. 3 is a flowchart for a method for switching states of a data processing device according to another embodiment of the present invention. As shown in FIG. 3, the method for switching states of the data processing device comprises the following steps: step S302 of detecting whether a data interface stays in the operating state of the data interface and generating detection information; step S304 of determining whether the operating system stays in the operating state of the operating system when the detection information indicates that the data interface stays in the operating state of the data interface, and generating determination information, wherein the communication interface staying in the operating state of the communication interface means that there is a data communication between a USB communication interface and another data processing device, i.e. there is a data exchange; step S306 of generating a system state frequency-ascending command when the determination information indicates that the operating system stays in the low-power-consumption state; and step S308 of controlling the operating system to enter into the operating state of the operating system from the low-power-consumption state based on the system state frequency-ascending command, and controlling the communication interface to be enabled when the operation system enters from the low-power-consumption state to the operating state of the operating system.

Figure 4:
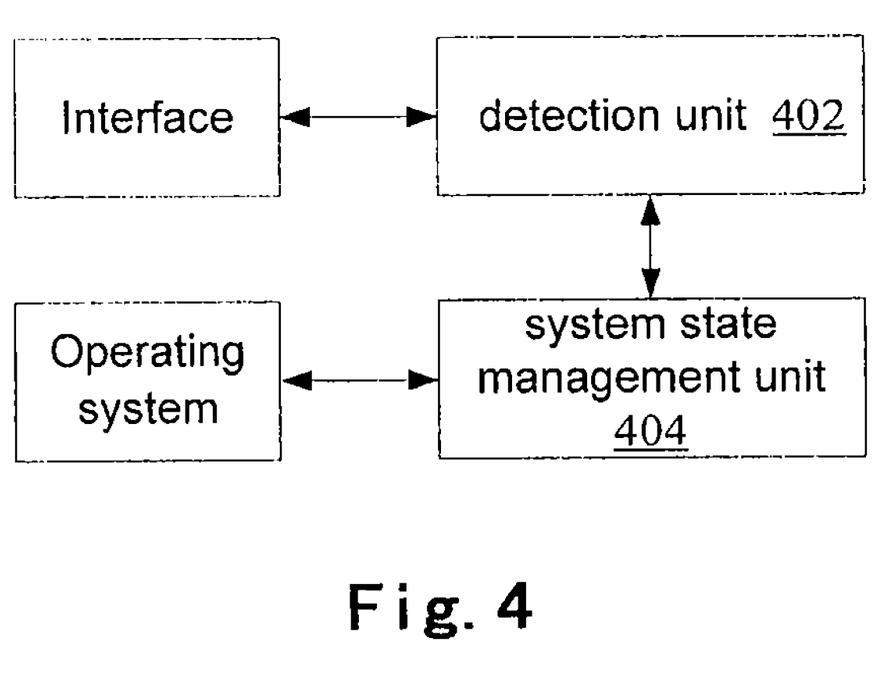
FIG. 4 is a block diagram for a data processing device according to one embodiment of the present invention.

FIG. 4 is a block diagram for a data processing device according to one embodiment of the present invention. As shown in FIG. 4, the data processing device further comprises: a detection unit 402 for detecting whether the communication interface stays in the operating state of the communication interface and generating detection information; a system state management unit 404, connected to the detection unit, for determining whether the operating system stays in the operating state of the operating system when the detection information indicates that the communication interface stays in the operating state of the communication interface and generating determination information, for generating a system state holding command when the determination information indicates that the operating system stays in the operating state of the operating system, and for controlling the operating system to stay in the operating state of the operating system based on the system state holding command.

The system state management unit comprises: a first determination unit, connected to the detection unit, for determining whether the operating system stays in the operating state of the operating system when the detection information indicates that the communication interface stays in the operating state of the communication interface and generating determination information; a first management unit, connected to the first determination unit, for generating the system state holding command when the determination information indicates that the operating system stays in the operating state of the operating system; and a first execution unit, connected to a first command unit, for controlling the operating system to stay in the operating state of the operating system based on the system state holding command, wherein the communication interface staying in the operating state of the communication interface means that there is a data communication between a USB communication interface and another data processing device, i.e. there is a data exchange.

The system state management unit further comprises: a second determination unit, connected to the detection unit, for determining whether the operating system stays in the operating state of the operating system when the detection information indicates that the communication interface stays in the non-operating state of the communication interface and generating determination information; a second management unit, connected to the second determination unit, for generating a system state frequency-reduction command when the determination information indicates that the operating system stays in the operating state of the operating system; and a second execution unit, connected to the second command unit, for controlling the operating system to enter into the low-power-consumption state from the operating state of the operating system based on the system state frequency-reduction command, wherein the communication interface staying in the non-operating state of the communication interface means that there is no data communication between a USB communication interface and another data processing device.

Figure 5:
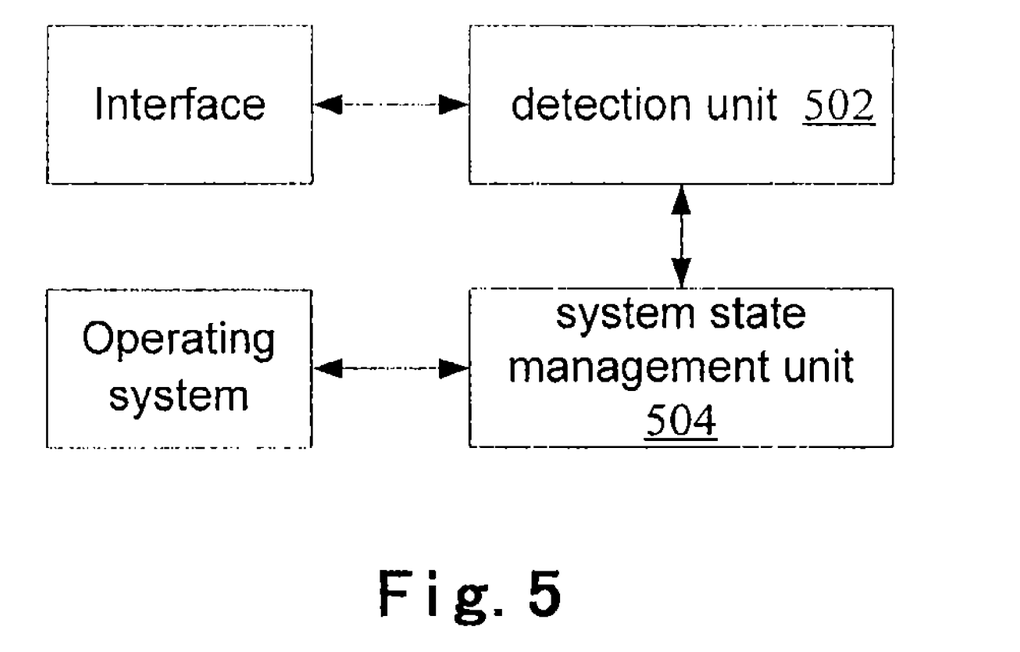
FIG. 5 is a block diagram for a data processing device according to another embodiment of the present invention.

FIG. 5 is a block diagram for a data processing device according to another embodiment of the present invention. As shown in FIG. 5, the data processing device further comprises: a detection unit 502 for detecting whether the communication interface stays in the operating state of the communication interface and generating detection information; a system state management unit 504, connected to the detection unit, for determining whether the operating system stays in the operating state of the operating system when the detection information indicates that the communication interface stays in the operating state of the communication interface and generating determination information, for generating a system state frequency-ascending command when the determination information indicates that the operating system stays in the low-power-consumption state, and for controlling the operating system to enter into the operating state of the operating system from the low-power-consumption state based on the system state frequency-ascending command, and controlling the communication interface to be enabled when the operating system enters into the operating state of the operating system from the low-power-consumption state.

The system state management unit comprises: a determination unit, connected to the detection unit, for determining whether the operating system stays in the operating state of the operating system when the detection information indicates that the communication interface stays in the operating state of the communication interface and generating determination information; a management unit, connected to the determination unit, for generating a system state frequency-ascending command when the determination information indicates that the operating system stays in the low-power-consumption state; and an execution unit, connected to a command unit, for controlling the operating system to enter into the operating state of the operating system from the low-power-consumption state based on the system state frequency-ascending command, and controlling the communication interface to be enabled when the operating system enters into the operating state of the operating system from the low-power-consumption state.

Preferably, the communication interface staying in the operating state of the communication interface means that a there is a data communication between a USB communication interface and another data processing device, i.e. there is a data exchange.

For example, an embedded system is given here for illustration, and an operating system thereof is WinCE. The embedded subsystem communicates with another data processing device via a USB (Universal Serial BUS) interface and is installed with a bottom driver of RNDIS. Herein, the operating system enables the USB interface by loading RNDIS. The USB interface is enabled when the embedded system stays in the operating state of the embedded system, and the USB interface is disabled when the embedded system stays in a low-power-consumption state. When the embedded system is to, but not yet, enter into the low-power-consumption state from the operating state of the embedded system, firstly it is detected whether the USB communication interface stays in the operating state of the USB communication interface, i.e. whether there is a communication between the USB communication interface and another data processing device. If there is no communication, and the embedded system stays in the operating state of the embedded system, it directly enters into the low-power-consumption state; and if there is being in communication, and the embedded system stays in the operating state of the embedded system, the embedded system is hold in the operating state of the embedded system.

Additionally, it is determined whether the embedded system stays in the operating state of the embedded system when the embedded system detects communication information sent from another data processing device. If the embedded system stays in the operating state of the embedded system, it will communicate with another data processing device directly via a USB communication interface. If the embedded system stays in the low-power-consumption state, it is necessary to firstly make the embedded system enter into the operating state of the embedded system from the low-power-consumption state and enable the USB communication interface, and then to communicate with another data processing device via the USB communication interface.

Additionally, in the ordinary operating systems such as Windows operating system, change of the system's operating frequency also occur during the state switching in order to reduce the system power consumption. However, such switching leads to a case in which the system can not normally handle a task such as a system interrupt during a certain period, thus resulting in malfunction. The present invention may be also applied to address such problem in the ordinary operating systems.

Hereinafter, an embodiment of the present invention will be illustrated by taking a computer containing an embedded subsystem as an example.

The computer comprises a host system, an embedded subsystem and a power supply such as a battery. An operating system of the host system for the computer is Windows, and an operating system of the embedded subsystem for the computer is WinCE. The host system communicates with the embedded subsystem via a USB (Universal Serial Bus) interface, and both the host system and the embedded subsystem are installed with a bottom-driver of RNDIS. Herein, the operating system enables the USB interface by loading RNDIS. The USB interface is enabled when the embedded subsystem and/or the host system stay(s) in the operating state of the embedded system and/or the host system, and the USB interface is disabled when the embedded subsystem and/or the host system stay(s) in the low-power-consumption state. The power supply is connected to the host system and the embedded subsystem and supplies them with power. In order to save the system power consumption of the whole computer and electric quantity of the battery, both the host system and the embedded subsystem of the computer enter into the low-power-consumption state, so as to reduce the system power consumption of the computer and the electric quantity of the battery. At the same time, data synchronization must be performed for data communication between the host system and the embedded subsystem. In this way, it is determined whether the embedded subsystem stays in the operating state of the embedded subsystem when it is necessary to perform data synchronization for data communication between the embedded subsystem and the host system. If the embedded subsystem stays in the operating state of the embedded subsystem, data communication is directly performed between the embedded subsystem and the host system via the USB interface. If the embedded subsystem stays in the low-power-consumption state (which is not operating state), the embedded subsystem enters into the operating state of the embedded subsystem from the low-power-consumption state, so as to enable the USB communication interface, via which data communication with the host system may occur. On the other hand, it is necessary for the host system to communicate with the embedded subsystem via the USB interface. It is determined whether the host system stays in the operating state of the host system, when the host system detects that there is a data communication at the USB interface. If the host system stays in the operating state of the host system, data communication is directly performed between the host system and the embedded subsystem via the USB communication interface. If the host system stays in the low-power-consumption state, it enters into the operating state of the host system from the low-power-consumption state, so as to enable the USB communication interface of the host system, thus securing a data communication with the embedded subsystem.

When either the host system or the embedded subsystem of the computer is to enter into the low-power-consumption state from the operating state of the host system or the embedded subsystem, it is firstly detected whether their respective USB communication interface stays in the operating state of the USB communication interface, i.e. there is a data communication. For example, in the case that the embedded subsystem of the computer is to enter into the low-power-consumption state from the operating state of the embedded subsystem, it is firstly detected whether its own USB communication interface is in a data communication with the host system. If there is no data communication, the embedded subsystem directly enters into the low-power-consumption state. If there is a data communication, the embedded subsystem is hold in the operating state of the embedded subsystem.

The present invention can not only secure communication of the communication interface, but also allow the operating system to handle normally and stably an interrupt, so as to reduce the system power consumption.

The above is only the preferred embodiments of the present invention and the present invention is not limited to the above embodiments. It will be appreciated for those skilled in the art that various modifications and changes can be made. Any modifications, equivalent substitutions and improvements without departing from the spirit and principle of the present invention, should fall in the protection scope of the present invention.

What is claimed is:

1. A method for switching states of a data processing device, the data processing device including an operating system and a communication interface for communicating with another data processing device, wherein the communication interface is enabled when the operating system stays in an operating state of the operating system, and the communication interface is disabled when the operating system stays in a low-power-consumption state, said method comprising the following steps of:
   detecting whether the communication interface stays in an operating state of the communication interface and generating detection information;
   determining whether the operating system stays in the operating state of the operating system when the detection information indicates that the communication interface stays in the operating state of the communication interface, and generating determination information;

generating a system state holding command when the determination information indicates that the operating system stays in the operating state of the operating system; and controlling the operating system to stay in the operating state of the operating system based on the system state holding command.

2. A method for switching states of a data processing device, the data processing device including an operating system and a communication interface for communicating with another data processing device, wherein the communication interface is enabled when the operating system stays in an operating state of the operating system, and the communication interface is disabled when the operating system stays in a low-power-consumption state, said method comprising the following steps of:

detecting whether the communication interface stays in an operating state of the communication interface and generating detection information;

determining whether the operating system stays in the operating state of the operating system when the detection information indicates that the communication interface stays in a non-operating state of the communication interface and generating determination information;

generating a system state frequency-reduction command when the determination information indicates that the operating system stays in the operating state of the operating system; and controlling the operating system to enter into the low-power-consumption state from the operating state of the operating system based on the system state frequency-reduction command.

3. A method for switching states of a data processing device, the data processing device including an operating system and a communication interface for communicating with another data processing device, wherein the communication interface is enabled when the operating system stays in an operating state of the operating system, and the communication interface is disabled when the operating system stays in a low-power-consumption state, said method comprising the following steps of:

detecting whether the communication interface stays in an operating state of the communication interface and generating detection information;

determining whether the operating system stays in the operating state of the operating system when the detection information indicates that the communication interface stays in the operating state of the communication interface and generating determination information;

generating a system state frequency-ascending command when the determination information indicates that the operating system stays in the low-power-consumption state; and controlling the operating system to enter into the operating state of the operating system from the low-power-consumption state based on the system state frequency-ascending command, and controlling the communication interface to be enabled when the operating system enters into the operating state of the operating system from the low-power-consumption state.

4. A data processing device, comprising:

an operating system and a communication interface for communicating with another data processing device, wherein the communication interface is enabled when the operating system stays in an operating state of the operating system, and the communication interface is disabled when the operating system stays in a low-power-consumption state, said device further comprising:

a detection unit for detecting whether the communication interface stays in an operating state of the communication interface and generating detection information;

a system state management unit, connected to the detection unit, for determining whether the operating system stays in the operating state of the operating system when the detection information indicates that the communication interface stays in the operating state of the communication interface and generating determination information, for generating a system state holding command when the determination information indicates that the operating system stays in the operating state of the operating system, and for controlling the operating system to stay in the operating state of the operating system based on the system state holding command.

5. The data processing device according to claim 4, wherein the system state management unit comprises:

a first determination unit, connected to the detection unit, for determining whether the operating system stays in the operating state of the operating system when the detection information indicates that the communication interface stays in the operating state of the communication interface and generating determination information;

a first management unit, connected to the first determination unit, for generating the system state holding command when the determination information indicates that the operating system stays in the operating state of the operating system; and a first execution unit, connected to a first command unit, for controlling the operating system to stay in the operating state of the operating system based on the system state holding command.

6. The data processing device according to claim 5, wherein the system state management unit further comprises:

a second determination unit, connected to the detection unit, for determining whether the operating system stays in the operating state of the operating system when the detection information indicates that the communication interface stays in a non-operating state of the communication interface and generating determination information;

a second management unit, connected to the second determination unit, for generating a system state frequency-reduction command when the determination information indicates that the operating system stays in the operating state of the operating system; and a second execution unit, connected to a second command unit, for controlling the operating system to enter into the low-power-consumption state from the operating state of the operating system based on the system state frequency-reduction command.

7. A data processing device comprising an operating system and a communication interface for communicating with another data processing device, wherein the communication interface is enabled when the operating system stays in operating state of the operating system, and the communication interface is disabled when the operating system stays in a low-power-consumption state, said device further comprising:

a detection unit for determining whether the communication interface stays in operating state of the communication interface and generating detection information; and a system state management unit, connected to the detection unit, for determining whether the operating system stays in the operating state of the operating system when the detection information indicates that the communication interface stays in the operating state of the communication interface and generating determination information, for generating a system state frequency-ascending command when the determination information indicates that the operating system stays in the low-power-consumption state, and for controlling the operating system to enter into the operating state of the operating system from the low-power-consumption state based on the system state frequency-ascending command, and controlling the communication interface to be enabled when the operating system enters into the operating state of the operating system from the low-power-consumption state.

8. The data processing device according to claim 7, wherein the system state management unit comprises:

a determination unit, connected to the detection unit, for determining whether the operating system stays in the operating state of the operating system when the detection information indicates that the communication interface stays in the operating state of the communication interface and generating determination information;

a management unit, connected to the determination unit, for generating a system state frequency-ascending command when the determination information indicates that the operating system stays in the low-power-consumption state; and an execution unit, connected to a command unit, for controlling the operating system to enter into the operating state of the operating system from the low-power-consumption state based on the system state frequency-ascending command, and controlling the communication interface to be enabled when the operating system enters into the operating state of the operating system from the low-power-consumption state.

* * * * *